May 31, 1927.
G. R. POWELL
1,630,760
FOOT CONTROL
Filed Oct. 2, 1926
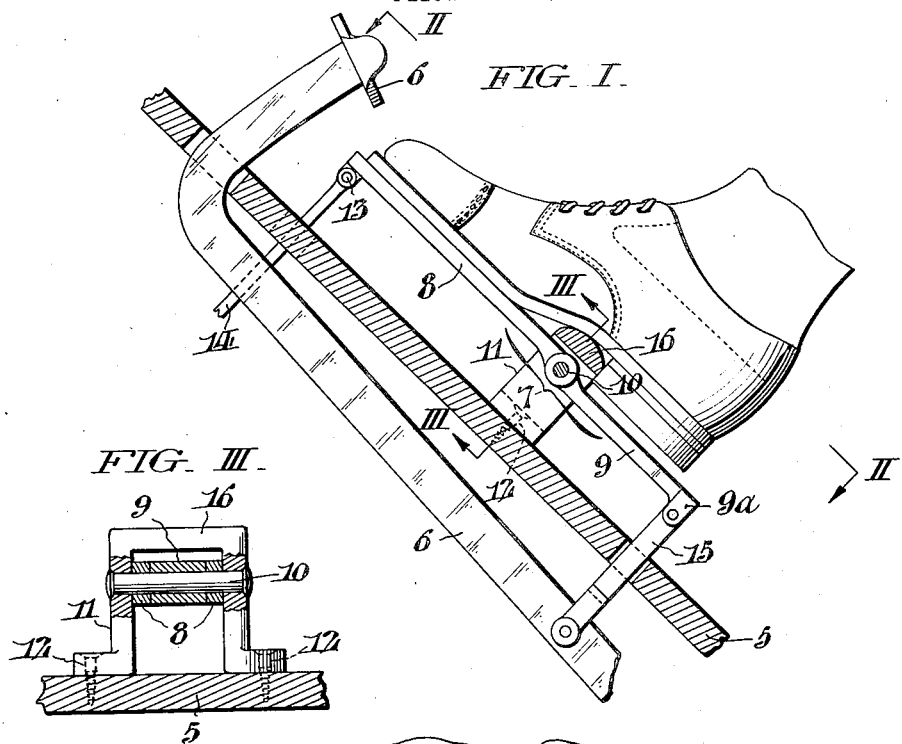
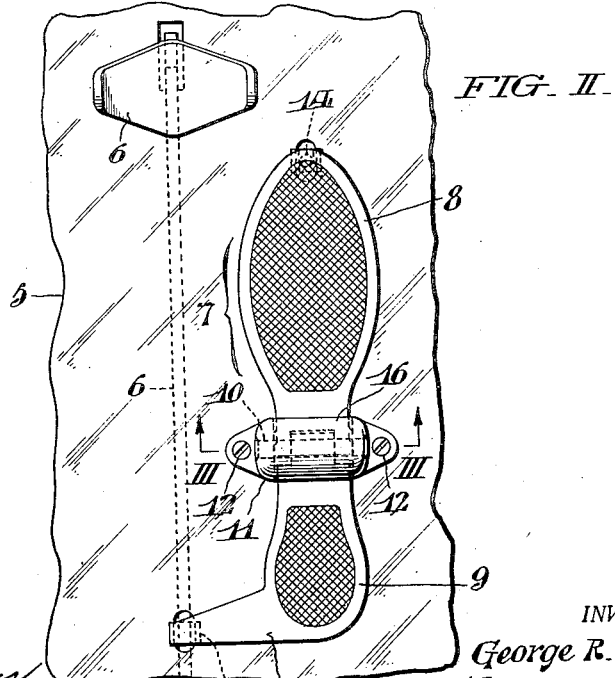
INVENTOR:
George R. Powell,
BY
ATTORNEYS.
WITNESSES Patented May 31, 1927.

1,630,760

UNITED STATES PATENT OFFICE.

GEORGE R. POWELL, OF MERION, PENNSYLVANIA.

FOOT CONTROL.

Application filed October 2, 1926. Serial No. 139,066.

This invention relates to foot controls, more particularly to a type useful in connection with the operation of motor vehicles. In the modern automobile individual pedals are usually provided side by side for controlling the brakes and the engine throttle, and since these are both operated by the right foot, the foot must be shifted laterally from one to the other as occasion requires. As a result, these pedals are often confused, sometimes with disastrous consequences.

The main object of my invention is to enable control of the engine and the brakes without requiring lateral movement of the foot. Accordingly it is directed toward provision of a dual control pedal embodying independently actuatable toe and heel sections, and means affording a support for the foot in actuating the said sections without attendant danger of the foot slipping.

My invention is further directed toward securing the above desiderata in a foot control capable of being initially incorporated in the motor vehicle, or applied as an auxiliary attachment in existing vehicles so that the usual connections to the engine throttle and the brakes may be utilized without requiring any alterations whatever in them.

In the drawings herewith Fig. I is a part section through the inclined floor board of a motor vehicle showing the usual brake pedal together with the dual control of my invention.

Fig. II is an elevation viewed in accordance with the arrows II—II in Fig. I; and Fig. III is a section taken as indicated by the arrows III—III in Figs. I and II.

With more detailed reference to these illustrations, 5 indicates the inclined foot board of the motor vehicle, and 6 the usual pedal by which the service brakes are operated. The dual control pedal is comprehensively designated by the numeral 7, and shown as disposed at that side of the service brake pedal 6 ordinarily occupied by the foot accelerator button or lever for governing the engine throttle. As shown the control 7 comprises a pedal with toe and heel sections 8, 9 that are pivoted for independent rocking movement about a common axis rod 10 in a stationary supporting bracket 11, the latter being secured to the foot board 5 by screws 12. The toe section 8 has projecting from its under side, lugs 13 for pivotal connection to the rod 14 which is coordinated with the engine throttle; while the heel section 9 in the present instance has a lateral extension 9ª that reaches to the brake pedal 6 to enable operative coupling with the latter through the medium of a connecting link 15.

The bracket 11, it will be noted from Fig. III, embodies a bridging bar 16 over the region of the pivot axis 10 for the pedal sections 8, 9, while the top surface of said bar is rounded for rockable engagement by the arch of the shoe or, in other words, said bar serves as the support for the foot in actuating the pedal, as well as to prevent the foot from slipping. The plane of the section 9 is preferably depressed somewhat relative to that of the toe sections 8 to compensate for the depth of the shoe heel.

In operation of the dual control, depression of the section 8 will be attended by increase in engine speed identically after the manner of customary accelerator action; while movement resultant upon depression of the section 9 is transmitted through the link 15 to the pedal lever 6 with consequent application of the brakes. My invention therefore obviates the necessity for shifting the foot laterally as in actuating the brakes and the engine throttle thereby rendering the control of an automobile safer and easier.

The illustrated arrangement is readily applicable as an auxiliary attachment to existing automobiles without requiring any alterations whatever, either in the throttle or brake connections. It is however to be understood that the device may be incorporated in the vehicles initially in lieu of the brake pedal 6 and the customary accelerator, in which event, the extension 9ª of the heel section 9 is dispensed with and the device located in the position usually occupied by the service brake pedal

Having thus described my invention, I claim:

1. A foot control comprising a pedal, a pivot located intermediate the ends of the pedal, and a stationary bridging bar over the pivot functional as a fulcrum rest for the foot in actuating the pedal.

2. A foot control comprising a pedal, a pivot located intermediate the ends of the pedal, and a stationary supporting bracket providing a bridging bar over the pivot functional as a fulcrum rest for the foot in actuating the pedal.

3. A foot control comprising a pedal with independently-pivoted sections adapted to be actuated respectively by the heel and toe, a pivot for said sections and a bridge bar over the pivot functional as a fulcrum rest for the foot in actuating the pedal sections.

4. A foot control comprising a pedal with independent sections adapted to be actuated respectively by the heel and toe, a common pivot axis for said sections, and a stationary supporting bracket providing a bridging bar over the pivot axis functional as a fulcrum rest for the foot in actuating the pedal sections.

5. A foot control comprising a pedal with independently-pivoted sections adapted to be actuated respectively by the heel and toe, the level of the heel section being somewhat depressed relative to that of the toe section, a pivot for said sections, and a bridging bar over the pivot functional as a fulcrum rest for the foot in actuating the pedal.

6. A foot control for motor vehicles adapted to be located to one side of the usual brake pedal and comprising a pedal with independently-pivoted sections adapted to be actuated respectively by the heel and toe, the toe section having provisions for operative connection to the engine throttle, and the heel section, a lateral extension reaching to, and coupled with the usual brake pedal.

In testimony whereof, I have hereunto signed my name at Philadelphia, Pennsylvania, this twenty seventh day of September, 1926.

GEORGE R. POWELL.